United States Patent [19]

Izawa et al.

[11] Patent Number: 5,678,847
[45] Date of Patent: Oct. 21, 1997

[54] ACTIVE SUSPENSION SYSTEM

[75] Inventors: Masaki Izawa; Hirotada Ito; Tsukasa Fukuzato; Takuju Nakamura, all of Wako, Japan

[73] Assignee: Honda Giken Kogyo Kabushiki Kaisha, Tokyo, Japan

[21] Appl. No.: 589,219

[22] Filed: Jan. 22, 1996

[30] Foreign Application Priority Data

Jan. 23, 1995 [JP] Japan .................. 7-008541

[51] Int. Cl.[6] .................................. B60G 11/26
[52] U.S. Cl. ................... 280/707; 280/840; 280/6.1
[58] Field of Search .................. 280/840, 6.1, 703, 280/704, 707

[56] References Cited

U.S. PATENT DOCUMENTS 4,958,584  2/1990  Williamson .................. 280/704
4,971,348  11/1990  Oyama ........................ 280/661
5,060,959  10/1991  Davis ........................ 280/6.1

Primary Examiner—Kenneth R. Rice
Attorney, Agent, or Firm—Weiner, Carrier, Burt & Esser, P.C.; Joseph P. Carrier; Irving M. Weiner

[57] ABSTRACT

In an active suspension system, an electromagnetic actuator is interposed between a tube connected to a vehicle body and a rod connected to a wheel. The electromagnetic actuator includes a motor vertically slidably accommodated within the tube and supported in a floating manner by motor supporting springs, and a ball screw driven by the motor. The displacement between the vehicle body and the wheel and the load are controlled by driving the ball screw by the motor. When a fierce load is applied from the wheel, the motor itself resiliently moves upwardly while compressing one of the motor supporting springs, thereby permitting the upward movement of the rod to prevent the locking of the active suspension system, leading to an enhanced riding comfort.

22 Claims, 3 Drawing Sheets

ACTIVE SUSPENSION SYSTEM

BACKGROUND OF THE INVENTION

1. Field of the Invention

The present invention relates to an active suspension system including an electromagnetic actuator which is disposed between a wheel and a vehicle body and which comprises a screw means having externally and internally threaded members meshed with each other, and a motor for driving the screw means in an expanding and contracting manner.

2. Description of the Related Art

Such an active suspension system is known, for example, from U.S. Pat. No. 5,060,959.

However, the above known active suspension system has a problem that when the wheel runs over a small stone or the like, even if a control device tries to drive the actuator so as to displace the wheel with respect to the vehicle body, the actuator cannot follow such a sudden displacement of the wheel and hence, the suspension is brought into a substantially locked state, so-called locking phenomenon, resulting in a reduced riding comfort.

SUMMARY OF THE INVENTION

Accordingly, it is an object of the present invention to provide an active suspension system, wherein even if a fierce load is applied from the wheel, the locking phenomenon cannot be caused.

To achieve the above object, according to a first aspect and feature of the present invention, there is provided an active suspension system comprising an electromagnetic actuator which is disposed between a wheel and a vehicle body and which is comprised of a screw means having externally and internally threaded members meshed with each other, and a motor for driving the screw means in an expanding and contracting manner, wherein at least one of the motor and the screw means is resiliently supported on at least one of the wheel and the vehicle body through a spring means.

With the first feature of the present invention, even if a fierce load is applied which the actuator can not follow at the operational speed of the motor, the load can be absorbed by the resilient deformation of the spring means to avoid the locking phenomenon of the suspension, thereby preventing a reduction in riding comfort.

According to a second aspect and feature of the present invention, in addition to the first feature, the motor is resiliently supported, through the spring means, within a tube connected to the vehicle body, and the screw means as driven in an expanding and contracting manner by the motor is supported on a rod connected to the wheel.

With the second feature of the present invention, the suspension can be downsized by utilizing the tube as a support member for the motor and the spring means.

According to a third aspect and feature of the present invention, in addition to the second feature, the tube and the motor are interconnected through a damper.

With the third feature of the present invention, the apparent sprung mass can be increased to lower the resonance point of the vertical vibration of the vehicle body.

The above and other objects, features and advantages of the invention will become apparent from the following detailed description of preferred embodiments taken in conjunction with the accompanying drawings.

DETAILED DESCRIPTION OF THE PREFERRED EMBODIMENTS

Figure 1:
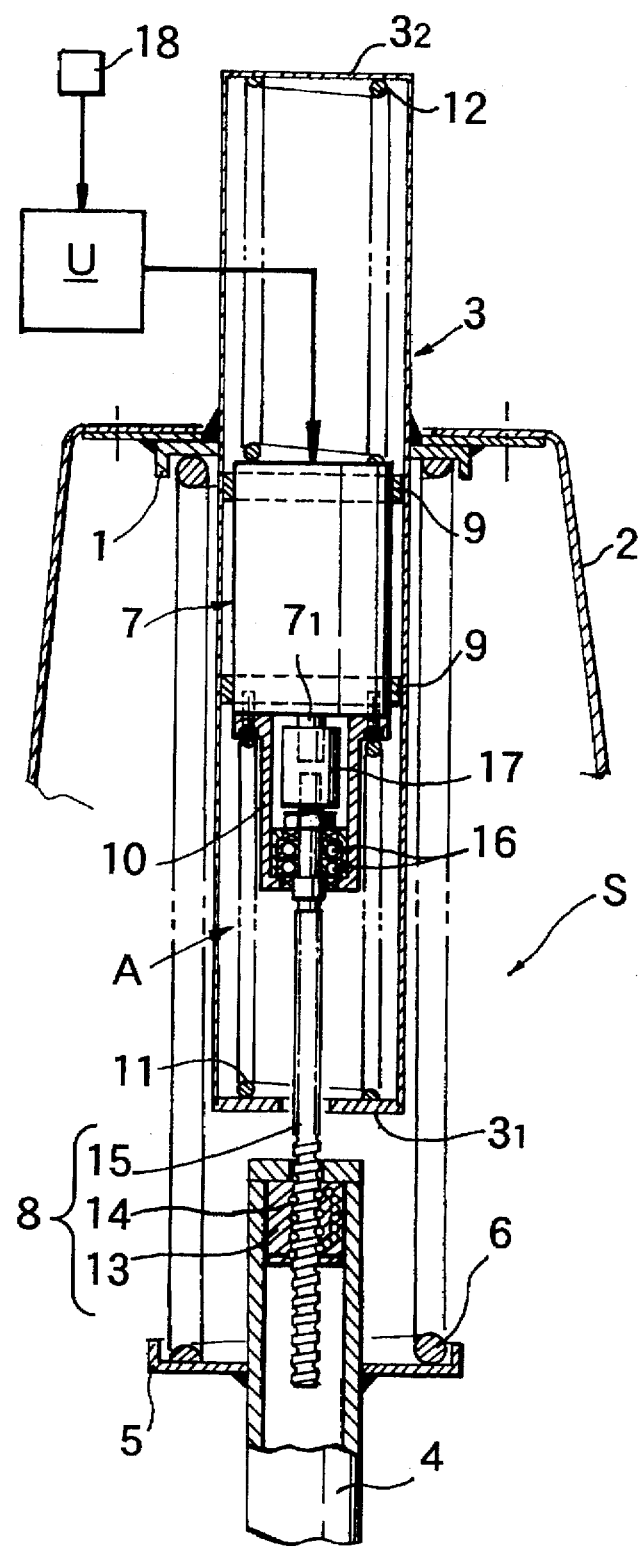
FIG. 1 is a vertical sectional view of an active suspension system according to a first embodiment of the present invention.

A first embodiment of the present invention will now be described with reference to FIG. 1.

An active suspension system S is interposed between a wheel of a vehicle and a vehicle body 2. The active suspension system S includes a tube 3 connected to the vehicle body 2 through a spring seat 1 welded to an outer periphery of the tube 3, and a rod 4 connected at its lower end to the wheel through a knuckle or a suspension arm. The tube 3 and the rod 4 are coaxially disposed, and a main spring 6 is compressed between a spring seat 5 welded to an outer periphery of the rod 4 and the spring seat 1 of the tube 3.

An electromagnetic actuator A for controlling the displacement and load between the tube 3 and the rod 4 includes a motor 7 and a ball screw 8.

The motor 7 is accommodated within the tube 3 and supported for axial sliding movement along an inner peripheral surface of the tube 3 through two sliders 9 mounted on an outer periphery of the motor 7. During the sliding movement of the motor 7, the rotation of the motor 7 about an axis thereof is limited by a detent means which is not shown. A first motor supporting spring 11 is compressed between a flange portion of a bearing holder 10 fixed to a lower surface of the motor 7 and a lower wall $3_1$ of the tube 3. A second motor supporting spring 12 is compressed between an upper surface of the motor 7 and an upper wall $3_2$ of the tube 3. A predetermined load is applied to the motor supporting springs 11 and 12 and thus, the motor 7 is supported in a floating manner at a location at which resilient forces of the motor supporting springs 11 and 12 are balanced.

In this way, by using the two motor supporting springs 11 and 12, both of which function only in compressing directions relative to the motor, it is possible to provide a sufficient strength as compared with a case in which a single motor supporting spring is used in both compressing and stretching directions. In addition, it is possible to make the active suspension system compact by accommodating the motor 7 and the motor supporting springs 11 and 12 within the tube 3.

The ball screw 8 includes an internally threaded member 13 fixedly mounted at an upper end of the rod 4, and an externally threaded member 15 threadedly meshed with the internally threaded member 13 through a large number of balls 14. The externally threaded member 15 is disposed coaxially with the tube 3 and the rod 4, and an upper end of the externally threaded member 15 extends into the tube 3 and is supported by a pair of ball bearings 16 mounted in the bearing holder 10. A lower end of an output shaft $7_1$ extending downwardly from the motor 7 and the upper end of the externally threaded member 15 are coupled to each other by a coupling 17.

An acceleration sensor 18 for detecting a vertical acceleration is mounted in place on the vehicle body supported by a sprung portion of the vehicle, i.e., by the active suspension system S. The operation of the motor 7 is controlled by an electronic control unit U to which a signal form the acceleration sensor 18 is supplied.

The main spring 6 permits a vertical movement of the wheel with respect to the vehicle body, while supporting most of the weight of the sprung portion of the vehicle, and prevents an unevenness of a road surface from being transmitted to the vehicle body. The electromagnetic actuator A functions as a shock absorber and damps the vertical vibration of the vehicle body applied by the main spring 6. The function of the electromagnetic actuator A will be described below.

When the motor 7 is driven, the externally threaded member 15 of the ball screw 8 is rotated relative to the internally threaded member 13, thereby pushing the rod 4 downwardly with respect to the motor 7, or drawing the rod 4 upwardly with respect to the motor 7. When the rod 4 is pushed downwardly, the reaction force causes the motor 7 to be moved upwardly within the tube 3, while compressing the second motor supporting spring 12, and a downward load produced with the compression of the second motor supporting spring 12 is applied to the rod 4. On the other hand, when the rod 4 is drawn upwardly, the reaction force causes the motor 7 to be moved downwardly within the tube 3, while compressing the first motor supporting spring 11, and an upward load produced with the compression of the first motor supporting spring 11 is applied to the rod 4. Therefore, a damping force can be applied to the vertical vibration of the vehicle body by controlling the operation of the motor 7 in response to the vertical vibration of the vehicle body.

The control of the motor 7 is carried out, for example, in the following manner. The vertical acceleration of the vehicle body is detected by the acceleration sensor 18. If the vertical acceleration is downward, the rod 4 is pushed downwardly to generate an upward load. If the vertical acceleration is upward, the rod 4 is drawn upwardly to generate a downward load.

At that time, if the voltage applied to the motor 7 is proportional to the vertical acceleration of the vehicle body detected by the acceleration sensor 18, the motor output shaft $7_1$ is rotated at a rotational speed proportional to the applied voltage and hence, the speed of vertical movement of the motor 7 within the tube 3 is proportional to the vertical acceleration. Therefore, the vertical moving speed of the vehicle body obtained by the integration of the vertical acceleration is proportional to the displacement of the motor 7 (i.e., the load generated by the first and second motor supporting springs 11 and 12) obtained by the integration of the vertical moving speed of the motor 7.

By the simple control which causes the voltage applied to the motor 7 to be varied in proportion to the vertical acceleration of the vehicle body, it is possible to cause the first and second motor supporting springs 11 and 12 to generate a damping force dependent upon the vertical moving speed of the vehicle body. Thus, a function equivalent to that of a so-called skyhook damper adapted to generate a damping force dependent upon an expansion and contraction speed attendant on the vertical movement of the vehicle can be realized without need for a complicated valve control of known hydraulically actuated active suspensions.

Now, if the motor 7 and rod 4 of the invention were simply connected to the vehicle body 2 and the wheel in a conventional manner, when the wheel runs over a small stone or the like during traveling of the vehicle, a resulting shock is transferred as an upward load to the rod 4. When the fierce load is applied to the rod 4 in this manner, even if the load is intended to be absorbed by driving the motor 7 to draw the rod 4 upwardly, the rod 4 is brought into a substantially locked state, because there is a limit for the operational speed of the motor 7. Further, when the fierce load is applied to the rod 4, the externally threaded member 15 of the ball screw 8 is rotated by such load to permit the upward movement of the rod 4. However, the rotor of the motor 7 has an inertial moment which is not small and hence, quick rotation of the externally threaded member 15 due to the fierce load is limited and, again, the rod 4 is brought into a locked state.

In this preferred embodiment of the invention, however, when the fierce load is applied to the rod 4, the motor 7 itself can be resiliently moved upwardly within the tube 3 by such load, while compressing the second motor supporting spring 12 and hence, a situation is avoided that the rod 4 is brought into its locked state. Thus, when the vehicle travels on a road surface having an unevenness, the riding comfort of the vehicle can substantially be enhanced.

In addition to the vertical movement of the motor 7, it is also possible according to the invention to vertically move the rod 4 by operating the ball screw 8 by the motor 7 to adjust the height of the vehicle because the rod is not in a locked state thereof.

A second embodiment of the present invention will now be described with reference to FIGS. 2 to 4. The structure of the second embodiment includes many of the same components as that of the first embodiment, and they are indicated by like reference characters, while the second embodiment also includes a damper 19 discussed further below.

Figure 2:
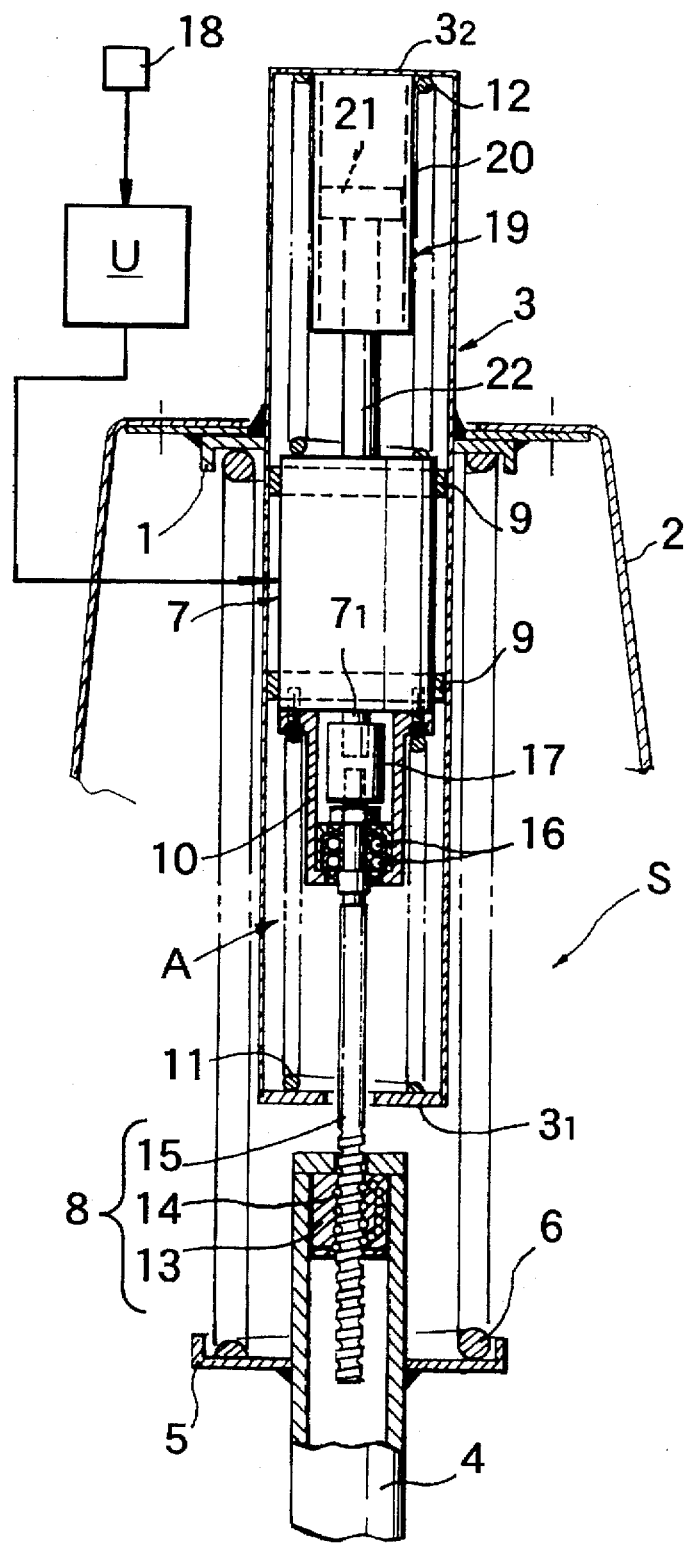
FIG. 2 is a vertical sectional view of an active suspension system according to a second embodiment of the present invention.

Referring to FIG. 2, in an active suspension system S according to the second embodiment, the lower surface of the upper wall $3_2$ of the tube 3 and the upper surface of the motor 7 in the first embodiment are connected with each other by the damper 19. More specifically, the damper 19 includes a cylinder 20, a piston 21 and a piston rod 22. The cylinder 20 is coupled to the lower surface of the upper wall $3_2$ of the tube 3, and the piston rod 22 is coupled to the upper surface of the motor 7.

Figure 4:
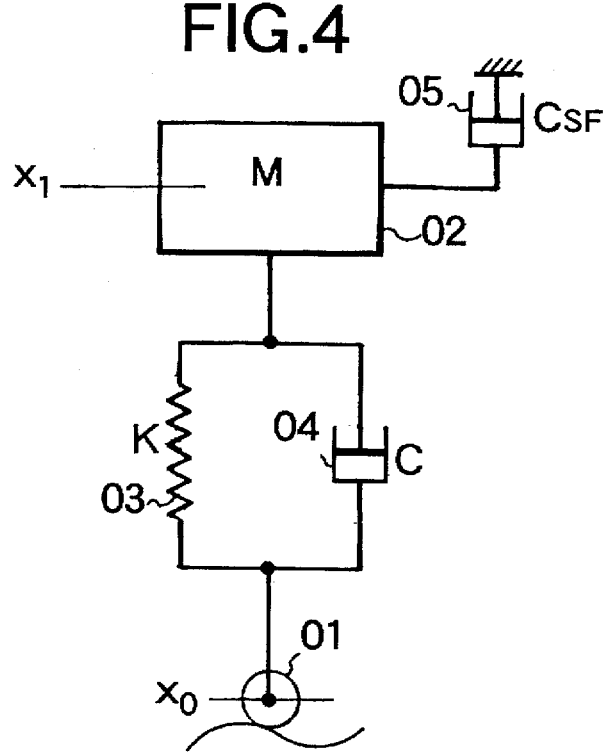
FIG. 4 is a diagrammatic illustration of a model of a skyhook damper.

FIG. 4 shows a model of a usual skyhook damper. A wheel 01 and a vehicle body 02 are interconnected by a spring 03 and a damper 04 which are disposed in parallel to each other. The vehicle body 02 and a phantom fixed point in the air are interconnected by a skyhook damper 05. Here, if $x_0$ is an unsprung displacement; $x_1$ is a sprung displacement; M is a sprung mass; K is a spring constant of the spring 03; C is a damping constant of the damper 04; and $C_{SF}$ is a damping function of the skyhook damper 05, an equation of motion of the model shown in FIG. 4 is given by the following expression (1):

$$M\ddot{x}_1 + C(\dot{x}_1 - \dot{x}_0) + K(x_1 - x_0) + C_{SF}\dot{x}_1 = 0 \quad (1)$$

If the expression (1) is Laplace-transformed, a transfer function is given by the following expression (2):

$$\frac{X_1(S)}{X_0(S)} = \frac{CS + K}{MS^2 + (C + C_{SF})S + K} \quad (2)$$

wherein S is a Laplace operator.

The $C_{SF}S$ term in the denominator of the expression (2) is a term which was added because the skyhook damper 05 was provided. When an external force is applied to the vehicle body 02, the skyhook damper 05 acts to increase the damping constant C of the damper 04 due to the presence of the $C_{SF}S$ term, and the change in attitude of the vehicle body is inhibited. On the other hand, when an external force is applied to the wheel 01, i.e., when the spring 03 is compressed to push the vehicle body upwardly, or when the spring 03 is expanded to draw the vehicle body downwardly, the skyhook damper 05 acts to decrease the damping constant C of the damper 04 due to the presence of the $C_{SF}S$ term, and the vibration from the road surface is intercepted.

Figure 3:
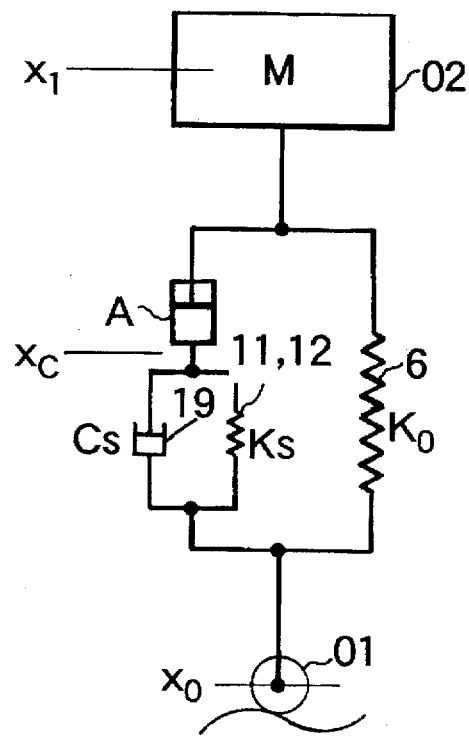
FIG. 3 is a diagrammatic illustration of a model of the active suspension system according to the second embodiment.

FIG. 3 shows a diagrammatic model of the second embodiment (see FIG. 2). The wheel 01 and the vehicle body 02 are interconnected by the main spring 6, and the electromagnetic actuator A is supported in series by the first and second motor supporting springs 11 and 12 and the damper 19 which are disposed in parallel to each other. The first and second motor supporting springs 11 and 12, the damper 19 and the electromagnetic actuator A are interposed between the wheel 01 and the vehicle body 02. Here, if $x_0$ is an unsprung displacement; $x_1$ is a sprung displacement; xc is a displacement of the motor 7 of the electromagnetic actuator A; M is a sprung mass; $K_0$ is a spring constant of the main spring 6; Ks is a spring constant of each of the first and second motor supporting springs 11 and 12; and Cs is a damping constant of the damper 19, an equation of motion of the model shown in FIG. 3 is given by the following expression (3):

$$M\ddot{x}_1 + Cs(\dot{x}c - \dot{x}_0) + Ks(xc - x_0) + K_0(x_1 - x_0) = 0 \quad (3)$$

Because the operational speed (expansion and contraction speed) of the electromagnetic actuator A is proportional to the vertical acceleration of the vehicle body 02, the following expression (4) is established:

$$\dot{x}c - \dot{x}_1 = P\ddot{x}_1 \quad (4)$$

wherein P is a proportional constant. If the expressions (3) and (4) are Laplace-transformed, a transfer function is given by the following expression (5):

$$\frac{X_1(S)}{X_0(S)} = \frac{CsS + Ks + K_0}{(M + (PCs)S^2 + (Cs + PKs)S + Ks + K_0} \quad (5)$$

wherein S is a Laplace operator.

As apparent from the comparison of a secondary term in the denominator of the expression (2) which is the transfer function of the usual skyhook damper with a secondary term in the denominator of the expression (5) which is the transfer function of the active suspension system S in the second embodiment, it can be seen that PCs exhibits an effect to substantially increase the sprung mass M to lower the resonant point of the vertical vibration of the vehicle body. In addition, as apparent from the comparison of primary terms in the expressions (2) and (5) with each other, it can be seen that PKs exhibits an effect of the skyhook damper.

Although the presently preferred embodiments of the present invention have been described in detail, it will be understood that the present invention is not limited to the above-described embodiments, and various modifications in design may be made without departing from the spirit and scope of the invention defined in claims.

For example, the tube 3 is preferably connected at the side of the vehicle body and the rod 4 is preferably connected at the side of the wheel in the embodiments, but such positional relationship between the tube 3 and the rod 4 may be reversed. Therefore, the tube 3 may be connected at the side of the wheel, and the rod 4 may be connected at the side of the vehicle body.

The entire motor 7 is slidably supported with respect to the tube 3 in the embodiments, but only a portion of the motor 7 may be slidably supported with respect to the tube 3. More specifically, the stator of the motor 7 may be fixed to an inner periphery of the tube 3, and the rotor may be slidably supported with respect to the tube 3.

In addition, the motor 7 may be fixed to the tube 3, and the ball screw 8 may be slidably supported with respect to the rod 4 by a spring means. As understood from the foregoing, in the active suspension system of the invention at least one of the motor 7 and the ball screw 8 need only be resiliently supported on at least one of the wheel and the vehicle body through the spring means.

What is claimed is:

1. An active suspension system comprising an electromagnetic actuator which is disposed between a wheel and a vehicle body and which comprises a screw means having externally and internally threaded members meshed with each other, and a motor for driving said screw means in an expanding and contracting manner in response to external forces acting on the wheel and the vehicle body while traveling, wherein at least one of said motor and said screw means is resiliently supported on at least one of said wheel and said vehicle body through a spring means.

2. An active suspension system according to claim 1, wherein said motor is resiliently supported, through said spring means, within a tube connected to said vehicle body, and said screw means driven in an expanding and contracting manner by said motor is supported on a rod connected to said wheel.

3. An active suspension system according to claim 2, wherein said tube and said motor are interconnected through a damper also disposed within said tube.

4. An active suspension system according to claim 2, wherein said motor is slidably disposed within said tube.

5. An active suspension system according to claim 2, wherein said spring means is disposed within said tube.

6. An active suspension system according to claim 2, wherein said rod connected to said wheel extends substantially vertically.

7. An active suspension system according to claim 1, further including a damper operatively disposed between said vehicle body and one of said motor and said screw means.

8. An active suspension system according to claim 1, wherein said spring means is pre-loaded for normally applying a compressive force to said at least one of said motor and said screw means.

9. An active suspension system according to claim 1, further including control means for applying a control signal to the motor which is varied in substantial proportion to a vertical acceleration of the vehicle body.

10. An active suspension system according to claim 1, further including means for detecting vertical movement of at least the vehicle body; and means for controlling said motor based on detected vertical movement of the vehicle body.

11. An active suspension system comprising an electromagnetic actuator which is disposed between a wheel and a vehicle body and which comprises a screw means having externally and internally threaded members meshed with each other, and a motor for driving said screw means in an expanding and contracting manner, wherein at least one of said motor and said screw means is resiliently supported on at least one of said wheel and said vehicle body through a spring means;

said spring means being pre-loaded for normally applying a compressive force to at least one of said motor and said screw means; and said spring means comprises a pair of springs disposed to resiliently support said at least one of said motor and said screw means therebetween and each of said springs is pre-loaded.

12. An active suspension system comprising an electromagnetic actuator which is disposed between a wheel and a vehicle body and which comprises a screw means having externally and internally threaded members meshed with each other, and a motor for driving said screw means in an expanding and contracting manner, wherein at least one of said motor and said screw means is resiliently supported on at least one of said wheel and said vehicle body through a spring means;

said motor being resiliently supported, through said spring means, within a tube connected to said vehicle body, and said screw means driven in an expanding and contracting manner by said motor being supported on a rod connected to said wheel; and said spring means including a pair of springs disposed to resiliently support said motor therebetween within said tube, and each of said springs is pre-loaded to apply a compressive force to said motor.

13. An electrically powered active suspension for a vehicle, comprising:

an electrically powered actuator disposed between a wheel and a vehicle body and operative to produce a force between the wheel and a vehicle body in response to external forces acting on the wheel and the vehicle body while the vehicle is traveling; and spring means for resiliently supporting said actuator on at least one of said wheel and said vehicle body.

14. An active suspension system according to claim 13, further including a damper operatively connecting said actuator and one of said vehicle body and said wheel.

15. An active suspension system according to claim 14, wherein said spring means is pre-loaded for normally applying a compressive force to a portion of said actuator.

16. An active suspension system according to claim 13, wherein said spring means is pre-loaded for normally applying a compressive force to a portion of said actuator.

17. An active suspension system according to claim 13, wherein a portion of said actuator is resiliently supported, through said spring means, within a tube connected to said vehicle body.

18. An active suspension system according to claim 17, wherein said actuator as supported by said spring means is slidably disposed within said tube.

19. An active suspension system according to claim 17, wherein said springmeans is disposed within said tube.

20. An active suspension system according to claim 13, including control means for applying a control signal to said actuator which is varied in substantial proportion to a vertical acceleration of said vehicle body.

21. An electrically powered active suspension according to claim 13, further including:

means for detecting vertical movement of at least the vehicle body; and means for controlling said actuator based on detected vertical movement of said vehicle body.

22. An active suspension system for a vehicle, comprising:

an electrically powered actuator disposed between a wheel and a vehicle body and operative to produce a force between the wheel and the vehicle body in response to external forces acting on the wheel and the vehicle body;

spring means for resiliently supporting said actuator on at least one of said wheel and said vehicle body; and said spring means comprising a pair of springs disposed to resiliently support a portion of said actuator therebetween, and each of said springs is pre-loaded to normally apply a compressive force to the portion of said actuator.

* * * * *

UNITED STATES PATENT AND TRADEMARK OFFICE
CERTIFICATE OF CORRECTION

PATENT NO. : 5,678,847
DATED : 21 October 1997
INVENTOR(S) : Masaki Izawa, Hirotada Ito, Tsukasa Fukuzato, Takuju Nakamura It is certified that error appears in the above-indentified patent and that said Letters Patent is hereby corrected as shown below:

Column 3, line 5, change "form" to --from--.

Column 5, line numbered approximately 39, in equation (5) change "$(M + (PCs)S^2$" to --$(M + PCs)S^2$--.

Column 7, line numbered 28, change "a vehicle" to --the vehicle--.

Column 8, line 12, change "springmeans" to --spring means--;
  line numbered approximately 22, change "movement" to --movements--.

Signed and Sealed this

Third Day of February, 1998

BRUCE LEHMAN

Attest:

Attesting Officer

Commissioner of Patents and Trademarks